United States Patent [19]

Peterson et al.

[11] Patent Number: 4,498,128
[45] Date of Patent: Feb. 5, 1985

[54] CURRENT LIMIT CIRCUIT IN SINGLE-ENDED FORWARD CONVERTER UTILIZING CORE RESET TO INITIATE POWER SWITCH CONDUCTION

[75] Inventors: William A. Peterson, Hanover Township, Morris County; John C. Sines, South Somerville, both of N.J.

[73] Assignee: AT&T Bell Laboratories, Murray Hill, N.J.

[21] Appl. No.: 511,525

[22] Filed: Jul. 7, 1983

[51] Int. Cl.³ ............................................ H02M 3/335
[52] U.S. Cl. ..................................... 363/21; 363/56
[58] Field of Search ................ 363/18, 19, 20, 21, 363/23, 25, 52, 53, 55, 56; 323/276, 287

[56] References Cited

U.S. PATENT DOCUMENTS

| | | | |
|---|---|---|---|
| 4,058,758 | 11/1975 | Peterson | 363/23 |
| 4,172,276 | 10/1979 | Kameya | 363/19 |
| 4,263,643 | 4/1981 | Koike | 363/19 |
| 4,272,805 | 6/1981 | Iguchi et al. | 363/19 |
| 4,327,404 | 4/1982 | Horiguchi | 363/19 |
| 4,377,842 | 3/1983 | Cambier | 363/20 |

Primary Examiner—Peter S. Wong
Assistant Examiner—Judson H. Jones
Attorney, Agent, or Firm—Alfred G. Steinmetz

[57] ABSTRACT

Current limit protection against current overload is obtained in a core-reset, forward-type converter by inserting a properly selected impedance in the flyback current path. The voltage developed across the impedance is impressed against the secondary winding of the power transformer. During current overload, the voltage drop across the impedance maintains a voltage drop across the secondary winding delaying a zero crossing of the voltage and, hence, delaying the initialization of conduction in the converter power switch. The time delay in conduction initiation in the power switch reduces current output and effectively counteracts the overload current.

3 Claims, 2 Drawing Figures

CURRENT LIMIT CIRCUIT IN SINGLE-ENDED FORWARD CONVERTER UTILIZING CORE RESET TO INITIATE POWER SWITCH CONDUCTION

FIELD OF THE INVENTION

This invention relates to current limiting protection circuitry and, more particularly, to an arrangement for limiting an output current of a DC-to-DC converter that periodically initiates power switching with transformer core reset techniques.

BACKGROUND OF THE INVENTION

Overcurrent conditions in a DC-to-DC converter circuit are normally sensed by directly monitoring a current to be controlled, and initiating a current limit operation when it reaches a predetermined threshold level. This technique normally requires generating a current-responsive signal from some sensing device in the current path, and transmitting it to some control circuit, which evaluates it and initiates an appropriate control response. If transmission of the current-responsive signal is from the secondary to the primary side of the power circuit, separate signal isolation means may be required between the primary and secondary circuits.

Current may be sensed in the flyback path of the converters output filter rather than the main output power path of a converter. The short duration of the current flow therein means that the average current flow through the current-sensing device per cycle of operation is very small; and, hence, the power dissipation incurred in the sensing device is very low. Such an arrangement is disclosed in my U.S. Pat. No. 4,058,758, issued Nov. 15, 1977, and assigned to the same assignee as this application. In that arrangement, current in the flyback path is sensed by a current-sensing resistor and amplified and coupled through an optoisolator to a duty cycle control on the primary side of the converter. The impedance of the current-sensing resistor is kept as low as possible and as far as is consistent with the ability of a sensing amplifier to accurately amplify a voltage drop across it into a useful level voltage signal to be used in the current control process. The typical low voltage obtained requires a very stable and accurate amplifier, and other circuit components which usually make up a significant portion of the cost of the converter.

SUMMARY OF THE INVENTION

Therefore, a current limiting arrangement embodying the principles of the invention effectively interacts with the transformer core reset switching control of a DC-to-DC converter to limit output current and significantly reduce the number of circuit components and circuit complexity needed for a current limiting circuit. Current limit protection against current overload is obtained in a core reset forward-type converter by inserting a properly selected impedance in the flyback current path. The voltage developed across the impedance is impressed across the secondary winding of the power transformer. During current overload, the voltage drop across the impedance maintains a voltage drop across the secondary winding. This delays the voltage drop to zero across the secondary winding and also in a control winding connected to a zero crossing detector. Hence the drop to zero occurs beyond the time of occurrence of the normal transformer core reset and delays the initialization of conduction in the converter power switch which is responsive to the zero crossing detector. The time delay in conduction initiation in the power switch reduces current output and effectively counteracts the overload current condition.

BRIEF DESCRIPTION OF THE DRAWING

An appreciation of the invention may be obtained from the following specification and the accompanying drawing in which FIG. 1 discloses a single-ended DC-to-DC converter utilizing core reset techniques to initiate power switch conduction, and including on its secondary side a current limit protection circuit found in the prior art.

DETAILED DESCRIPTION

Figure 1:
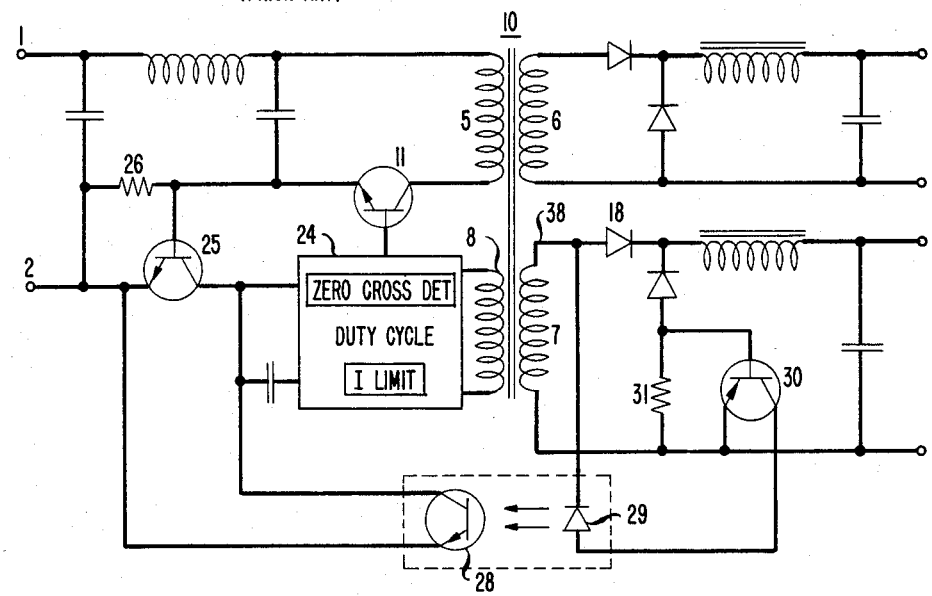

The converter circuit disclosed in FIG. 1 shows a schematic of a converter circuit, such as disclosed in my U.S. Pat. No. 4,058,758, and includes two overcurrent protection circuits to limit both a primary side current and an output current of one of the multiple outputs of the converter circuit.

The single-ended converter disclosed in FIG. 1 operates in a forward-type mode. That is, the rectifier diode 18, connected to terminal 38 of the secondary winding, conducts at the same time that the primary switching device is conductive. The converter in FIG. 1 is shown as having two output windings wound on the core of transformer 10. A separate current-limiting circuit is included to limit current on the primary winding 5, and one of the output windings 7 is connected to a network including a secondary current-limiting circuit to limit an output current of one of the two output circuits.

Two input terminals 1 and 2 of the converter are adapted to accept a DC voltage source, and are coupled by a power switch 11, shown as a transistor switch, to the primary winding 5. Power switch 11 is controlled by a duty cycle control circuit 24 to periodically enable it conducting and connect the voltage source to the primary winding 5 of the power transformer 10. The periodic conduction of the power switch induces a periodic pulse signal in the primary winding, which is magnetically coupled to each of the two output windings 6 and 7 which, in turn, in each output circuit, are rectified and filtered to provide a DC output voltage, dependent upon the respective turn ratios of the primary and two secondary windings of the power transformer.

The primary current limit circuit, included on the primary side of the power transformer, operates in response to a peak current detected in a current-sensing resistor 26. A current reaching a certain threshold biases a sensing transistor 25, havings its base emitter junction connected across the current-sensing resistor, into its conducting mode. Its collector is coupled to the duty cycle control circuit 24, which responds to reduce the overcurrent condition by limiting a duty cycle of the power switch 11.

The duty cycle control circuit is a periodic-type drive circuit, which periodically generates pulses with a controlled pulse width to drive the switching transistor 11 into saturated conduction. This pulse width is controlled in response to a variety of controls, which provide selected inputs to the duty cycle control. Inputs for initiating conduction in the power switch 11 are generated in response to the core reset characteristics of the power transformer 10. Inputs for terminating conduction include certain inputs provided by voltage regulation circuitry, which is not disclosed, and by the protection circuitry, as shown, namely; the primary and secondary overcurrent limit circuits. The duty cycle control circuit 24 includes a control transformer winding 8 connected to the core of the power transformer 10 in common with both the primary and secondary windings; and it is operative to detect, with a zero crossing detector included with the duty cycle control 24, the moment in time when the transformer core of transformer 10 periodically resets, by detecting a zero crossing of a voltage across the tertiary winding or control winding 8. While the voltage across this winding is theoretically zero at the moment of reset, in actual practice, it tends to have a small offset voltage value which the zero crossing detector is set to respond to. The occurrence of reset is utilized by the duty cycle control to periodically initiate conduction in the power switch or power transistor 11.

One of the output circuits connected to the secondary winding 7 includes an output current limit control circuit. It includes a current-sensing resistor 31 inserted in the flyback current path of the output filter circuit. When a current of a particular level or threshold is achieved, an amplifying transistor 30 is biased conducting by the voltage across resistor 31, causing current to flow through transistor 30 and a light emitting diode 29 whose light output is sensed by a phototransistor 28 on the primary side. The activated phototransistor 28 applies a signal to the duty cycle control circuit 24 which is operative to limit the conduction interval of the switching transistor 11 and hence limit the output current. Since both transistors 25 and 28 are connected in parallel, it is apparent that the first occurring overcurrent control or limit signal in either the primary or secondary side of the converter activates the current-limiting function of the duty cycle control 24.

While the overcurrent limit circuit on the secondary, shown in FIG. 1, is relatively reliable and economical, it requires additional operating components, including a separate DC signal isolation arrangement between the primary and secondary sides of the converter. The converter circuit shown in FIG. 2, which embodies the principles of the invention, provides a means for limiting output current in any one of several outputs of a multi-output DC-to-DC converter that control power switching initiation techniques utilizing the detection of transformer core reset. This result is accomplished with the addition of just one circuit component to the converter. While current in any of the multiple outputs may be controlled independently of the current in any of the other outputs by using this limiting technique, the illustrative current-limiting herein is shown in only one of the multiple outputs.

Figure 2:
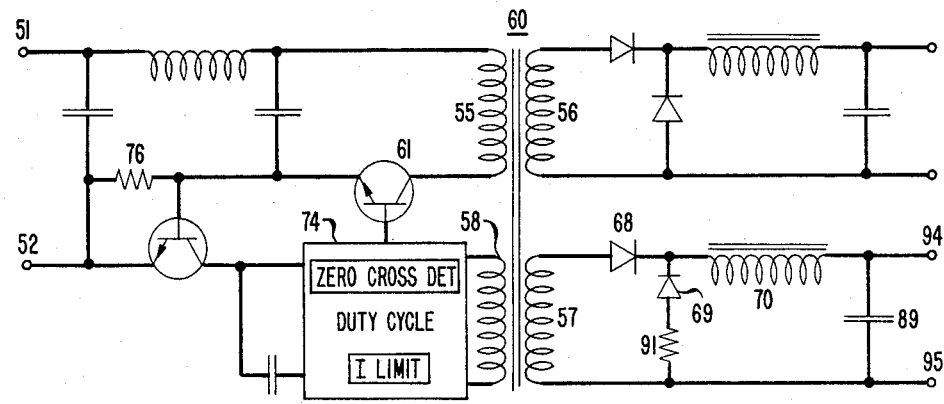
FIG. 2 discloses a single-ended DC-to-DC converter utilizing transformer core reset techniques, and including a current limit circuit on the secondary side of the converter embodying the principles of the invention.

The DC-to-DC converter shown in FIG. 2 includes input terminals 51 and 52 to accept a DC voltage source and a power switch 61 operative to couple the DC voltage to the primary winding 55 of the power transformer 60. Included in series with the power switching transistor is a current-sensing resistor 76, utilized as indicated with respect to the circuit of FIG. 1, to detect peak currents in the primary side of the converter. Switching of the power switch, or power switching transistor 61, is controlled in response to a duty cycle control 74 which, as described above with reference to FIG. 1, which includes a control winding 58 connected to the power transformer. The control winding 58, as in the control circuit of FIG. 1, monitors the volt seconds of both the charging and discharging cycles of the output circuits and initiates conduction in the power switch 61 when a discharge cycle has essentially discharged to zero. In other words, a zero crossing of the winding voltage or theoretically a core-reset has occurred when the discharge volt second product is substantially equal to the previous charge volt second product. The duty cycle control 74, as described above with reference to FIG. 1, also includes circuitry to respond to the current-limit sensing resistor 76 to limit a peak current on the primary side of the converter.

Two secondary circuits are shown to provide separate output voltages and, in accord with multi-output converters, substantially track each other due to the interaction of the magnetic flux in the core, which is common to both secondary windings 56 and 57. The second output circuit, being current-limited in FIG. 2, includes a rectifying diode 68, a filter inductor 70, a filter capacitor 89, and a flyback diode 69. In the second output circuit, a current control resistor 91 is inserted into the flyback current path. This resistor 91 is carefully selected in impedance value so that it acts to control the discharge voltage that appears across, or is monitored by, the control winding 58 in such a fashion as to provide current limit protection for this particular output circuit of the converter.

As indicated above, the converter utilizes transformer core reset characteristics to control the time at which conduction is initiated in the power switch. Normally, the duty cycle control biases the power switch conducting in response to the core reset voltage having discharged to substantially zero. The time required for the core to discharge to substantially zero is dependent on the voltage across the control winding during both the charge and discharge cycles, and the corresponding level of flux built up within the transformer core.

The operation of the carefully selected current control impedance or resistor 91 connected in series with the flyback diode 69 in achieving current limiting may best be understood by describing how the flyback current and resistor 91 cooperate in controlling the discharge cycle duration of the converter. Since the flyback current is representative of the load circuit, this arrangement accurately limits the load current.

The transformer winding orientations of transformer 60 are shown by the dot convention in FIG. 2, and define a converter having a forward-coupled-type mode of operation in which the power switch and rectifying diode conduct simultaneously. Once the off-time or nonconducting interval of the power switch or the discharge cycle has been initiated, the secondary winding has a voltage that presents a negative polarity at the orientation dot, reverse-biasing the rectifying diode 68. During the nonconduction interval, energy stored in the output filter inductor 70 continues to supply an output current, while its back EMF forward-biases the flyback diode 69, enabling the flyback current path. The current flowing through the current control resistor 91, connected in series with the flyback diode 69, generates a voltage drop which is substantially proportional to the output load current. The voltage drops of the electrical components around a loop, including flyback diode 69, rectifying diode 68, current control resistance 91, and secondary winding 57, may be expressed by the following voltage equation:

$$V_S + V_R - V_F - V_R = 0 \tag{1}$$

where
- $V_S$ is a voltage across secondary winding 57;
- $V_R$ is a voltage across rectifying diode 68;
- $V_F$ is a voltage across flyback diode 69;
- $V_R$ is a voltage across current control resistor 91;

and $$V_R = I_F R_C \tag{2}$$

where
- $I_F$ is the flyback current or output current during the flyback interval;
- $R_C$ is the resistance of the current control resistor 91.

As the discharge process continues, the voltage across the secondary winding 57 begins to drop toward zero as the transformer core is resetting. Assuming that the voltage drops across the rectifying diode 68 and flyback diode 69 are essentially equal in magnitude (i.e., each has identical characteristics), when the voltage across the secondary winding 57 equals the voltage across the current control resistor 91 in the flyback path, the rectifying diode 68 becomes forward-biased, allowing current to flow in the secondary winding and rectifying diode. Hence, at this point, the voltage across the resistor is a controlling factor in establishing a voltage drop across the secondary winding 57. The voltage drop across resistor 91 due to the flyback current retards voltage decay across winding 57. The voltage across the secondary winding 57 is reflected back, as modified by the turns ratio to the control winding 58. Base drive circuit 74 includes a zero crossing detector, which responds to the voltage on control winding 58, to determine when the discharge voltage across the winding has reached zero; or core reset has occurred. During this portion of the discharge period with diodes 68 and 69, the voltage across the control winding 58 is a direct function of the voltage drop across the current control resistor times the turns ratio, and is expressed by the equation:

$$V_X = I_F \times R_C \times n \tag{3}$$

where
- $V_X$ is the voltage of control winding 58;
- $n$ is the turns ratio of the control winding 58 to the secondary winding 57.

The zero crossing detector of duty cycle control 74 does not actually respond to initiate conduction in power switch 61 until the voltage has reached a zero cross threshold, so called because, in actual practice, there is a slight offset voltage at which the core reset takes place. Once the zero cross detector 74 responds to the zero cross threshold voltage, the power switch 61 is re-enabled or biased into conduction. During the discharge cycle, the sustained voltage across the control winding 58 falls towards this zero threshold level at a rate determined by the decay of current in the filter inductor 70. As this current decays, the voltage across current control resistor 91 is consequently reduced, therefore, in time, permitting the voltage across the control winding 58 to drop to the threshold level when the flyback current has diminished to a low value. The time interval required for the current to fall to a low level, and which determines the length of the discharge cycle, is controlled by the value of inductance of the filter inductor 70 and the voltage thereacross, which, during the flyback period, is essentially equal to the output voltage at the output terminals 94 and 95. The slope of the current discharged in the filter inductor 70 is proportional to the reduction in output voltage during the discharge period; and, hence, as the output voltage is reduced, perhaps in response to an overload condition, the slope of current decay is such that the current decrease in the inductor takes longer than normal. Hence, the off-time of power switch 74 is increased, lengthening the discharge cycle and producing an off-time proportional to the overload. Hence, it can be seen that, during a current overload, or short circuit, when the output voltage is significantly reduced, the discharge period is greatly expanded; and the net effect is an increased off-time or reduced duty cycle for the power switch that counteracts the overload current condition.

The level of the current limit is a direct function of both the turns ratio between the control and the secondary windings 58 and 57 and the impedance of the current control resistor 91 in the flyback path. Adjustment of either of these values can be utilized to adjust the current limit setting at which the current limit control begins to operate. The values of the turns ratio and the resistance in the flyback path may be expressed in terms of the desired current limit by the following equation:

$$I_{CL} = (V_X + V_T)\frac{n}{R_C} \tag{4}$$

where
- $I_{CL}$ is the desired limit current;
- $V_T$ is the offset voltage.

It is apparent from the foregoing that an individual output of a multi-output converter circuit can be limited to a value of current predetermined by an impedance placed in the flyback path of the output filter. In this arrangement, a single resistive component is operative as the current-limiting circuitry for a core-reset-type converter, and advantageously eliminates the need for additional special current-limit circuitry, especially separate circuitry requiring additional DC voltage isolation means as a control signal is sent from a secondary to a primary side of the converter circuit. This particular current-limiting circuitry requires only one component, no additional amplifying or isolating circuitry, and utilizes the transformer core zero cross detector which is part of the power switch drive circuit, in order to control the duty cycle to achieve output current limiting.

What is claimed is:

1. A forward type converter utilizing core reset techniques for controlling initiation of conduction in a power switch coupling DC voltage to a primary winding of a power transformer comprising:
   - the power transformer including an output winding and a control winding,
   - a rectifying diode coupling the output winding to a filter inductor
   - a flyback current path for the filter inductor operative to conduct current responsive to a filter inductor voltage when the power switch and rectifying diode are nonconducting and connected to shunt a series connection of the output winding and the rectifying diode and also connected to feed current into the filter inductor, the flyback current path including a flyback diode having its polarity oriented to conduct when the rectifying diode is nonconducting and a current limit control resistive impedance having a impedance magnitude to limit a rate of voltage decay across the output winding during a current overload so that initiation of conduction in the power switch is delayed sufficiently to reduce the current overload, the impedance magnitude of the current limit control resistive impedance being defined by the equation $$R_C = (V_X + V_T)\frac{n}{I_{CL}}$$

where $R_C$ is a resistance of the current limit control resistive impedance, n is a turns ratio of the control winding to the output winding $I_{CL}$ is a limit value of current permitted during current overload, $V_X$ is a voltage value across the control winding, and $V_T$ is an offset voltage representing a zero cross threshold voltage at which core reset occurs, and drive means coupled to the control winding to detect occurrence of the zero cross threshold voltage and operative in responsive thereto to initiate a conduction interval of the power switch.

2. A forward type converter as defined in claim 1 wherein the rectifying diode and the flyback diode have substantially identical voltage characteristics.

3. A forward type DC to DC converter in which a core reset of a power transformer is utilized for initiating current conduction in a power switch comprising:

drive means coupled for controlling conductivity in the power switch and including a control winding coupled to the power transformer and further including sense circuitry for sensing a zero crossing of a voltage of the control winding, the power transformer including a secondary winding, an output circuit connected to the secondary winding and including a rectifying diode connected in series with the secondary winding and having its polarity oriented so as to conduct in unison with conduction of the power switch, and output means for accepting a load the output circuit further including an output filter including an inductor and connecting the rectifying diode to the output means and including a flyback path connected in series with the inductor and shunting a series connection of the secondary winding and the rectifying diode, the flyback path including a flyback diode having its polarity oriented so as to conduct during nonconduction of the power switch, the flyback diode and rectifying diode having substantially identical voltage drop characteristics, the flyback path further including a current limit control impedance having an impedance $R_C$ as determined by the expression:

$$R_C = (V_X + V_T)\frac{n}{I_{CL}}$$

wherein $R_C$ is a resistance of the current limit control impedance, n is a turns ratio of the control winding to the output winding, $I_{CL}$ is a limit value of the current permitted during current overload, $V_X$ is a voltage value across the control winding, and $V_T$ is an offset voltage representing a zero cross threshold voltage at which core reset occurs, whereby a voltage drop across the current limit control impedance during nonconduction of the power switch is operative to prevent a voltage drop across the secondary winding from decaying to a value indicative of core reset until a flyback current in the output circuit has decayed below a critical threshold level.

* * * * *